(12) United States Patent
Strong et al.

(10) Patent No.: US 10,414,315 B2
(45) Date of Patent: Sep. 17, 2019

(54) INTERLOCKING STRAP CLAMP

(71) Applicant: Amatrimara, Inc., Oakville (CA)

(72) Inventors: Scott Strong, Ontario (CA); Michael Klinck, Ontario (CA)

(73) Assignee: Amatrimara Inc., c.o.b. River Drive Manufacturing, Oakville, Ontario (CA)

(*) Notice: Subject to any disclaimer, the term of this patent is extended or adjusted under 35 U.S.C. 154(b) by 0 days.

(21) Appl. No.: 15/832,057

(22) Filed: Dec. 5, 2017

(65) Prior Publication Data
US 2018/0162254 A1  Jun. 14, 2018

Related U.S. Application Data

(60) Provisional application No. 62/434,199, filed on Dec. 14, 2016.

(51) Int. Cl.
*B60N 3/02* (2006.01)

(52) U.S. Cl.
CPC .............. *B60N 3/026* (2013.01); *B60N 3/02* (2013.01); *B60Y 2200/143* (2013.01)

(58) Field of Classification Search
CPC ... Y10T 24/3958; Y10T 24/3967; F16G 11/06
See application file for complete search history.

(56) References Cited

U.S. PATENT DOCUMENTS

| | | | | |
|---|---|---|---|---|
| 1,041,300 A * | 10/1912 | Kliegl | ............... | H01R 13/506 191/23 R |
| 1,321,660 A * | 11/1919 | Moriarty | ............... | F16G 11/06 24/129 A |
| 1,787,017 A * | 12/1930 | Paul | ............... | E05D 5/12 403/191 |
| 2,296,182 A * | 9/1942 | Ratigan | ............... | E21B 19/02 24/135 R |
| 2,426,975 A * | 9/1947 | Roach | ............... | D03C 9/0683 139/88 |
| 3,357,066 A * | 12/1967 | Moritz | ............... | F16G 11/06 403/211 |
| 4,343,263 A * | 8/1982 | Gloggler | ............... | A01K 1/0011 119/523 |
| 4,662,035 A * | 5/1987 | Hatfield | ............... | E04H 17/06 24/135 R |
| 5,802,680 A * | 9/1998 | Postelwait | ............... | F16G 11/06 24/135 N |
| D424,924 S * | 5/2000 | Ackerman | ............... | D13/149 |
| 6,174,177 B1 * | 1/2001 | Auclair | ............... | H01R 4/44 439/100 |
| 7,461,610 B1 * | 12/2008 | Czepizak | ............... | B63B 21/04 114/218 |
| D763,671 S * | 8/2016 | Sizelove | ............... | D8/394 |
| 9,742,350 B2 * | 8/2017 | McPheeters | ............... | H02S 40/34 |
| 2007/0046014 A1 * | 3/2007 | Glover | ............... | B60N 2/2809 280/805 |
| 2013/0091668 A1 * | 4/2013 | Turdjian | ............... | A44B 11/06 24/579.11 |

* cited by examiner

*Primary Examiner* — Victor D Batson
*Assistant Examiner* — Matthew J Sullivan
(74) *Attorney, Agent, or Firm* — BakerHostetler

(57) ABSTRACT

A clamp for holding a looped strap as required for a passenger assist strap on a railing in a public transit vehicle, comprising a first piece and a second piece with interlocking sides to hold the strap loop together and also prevent the first and second pieces from twisting out of alignment.

4 Claims, 6 Drawing Sheets

INTERLOCKING STRAP CLAMP

CROSS REFERENCE TO RELATED APPLICATIONS

This application claims the benefit of U.S. Patent Application No. 62/434,199, filed Dec. 14, 2016, the entirety of which is incorporated herein for any and all purposes.

TECHNICAL FIELD

The present invention relates to strap clamps and more specifically to a clamp with interlocking sides for clamping a strap as required for a passenger assist strap on a railing in a public transit vehicle.

BACKGROUND

Passenger assist straps comprised of thermoplastic, webbing, fabric, leather or a combination of these, are installed within many public transit vehicles, namely buses, subways/metros and passenger trains. The passenger assist straps are traditionally installed on the horizontal overhead stanchions that run parallel to the aisle ways. Passengers can grasp the passenger assist straps to steady themselves while standing within the public transit vehicle.

In some cases, the strap will be folded in such a way as to create a top loop which will encircle the horizontal overhead handrail, and a bottom loop which passengers can grasp. The passenger assist strap can be held together with a clamp or buckle located at a portion of the assist strap between the top and bottom loops where there are typically three layers of strap material, the front strap, back strap and a middle strap portion since the front or back strap overlaps itself.

FIG. 1 shows a prior art clamp 10 which consists of two pieces which together are clamped onto a loop of strap with a machine screw, thus creating a top loop and bottom loop. As the machine screw is tightened, the two pieces of the clamp squeeze together onto the strap to keep the top and bottom loops intact. The sides of the front and back layers of the strap material may be partially covered by the sides of the clamp pieces, but the third middle layer will not be covered, so that the side of the first piece will not meet the side of the second piece of the clamp. This is advantageous since the clamp will not "bottom out" while being tightened in that the sides of the clamp pieces will not meet and therefore restrict the clamp from being further tightened onto the assist strap.

However, a disadvantage is that the machine screw can become loose, either through vibrations or tampering and the result is that the two pieces of the clamp can twist and become misaligned. This can cause damage or premature wear to the assist strap. Also, as the two pieces twist and misalign, they may contribute to the machine screw becoming even looser. Under these conditions, the machine screw can become so loose that the clamp will become completely disengaged. This in turn causes the top loop to become disengaged from the horizontal handrail to which the assist strap is installed and can lead to passenger injury if a passenger is holding onto the strap at such time and relying on its assistance.

SUMMARY

An interlocking strap clamp of the present invention comprises a first piece with a body and sides and a second piece with a body and interlocking sides relative to the first piece, wherein the first piece and second piece are capable of clamping onto a strap through a securing means.

The interlocking strap clamp may have L shaped interlocking sides or other interlocking shapes.

The securing means may be comprised of an opening with a diameter sized for a screw in the first piece and an internally threaded insert for the screw in the second piece.

In a second embodiment of the present invention the interlocking strap clamp may additionally comprise one or more teeth on the first piece and one or more teeth on the second piece, said teeth capable of digging into a strap when the first piece and second piece are clamping onto a strap.

BRIEF DESCRIPTION OF THE DRAWINGS

These and other aspects of the present invention will be apparent from the brief description of the drawings and the following detailed description in which.

DETAILED DESCRIPTION OF ILLUSTRATIVE EMBODIMENTS

Figure 1:
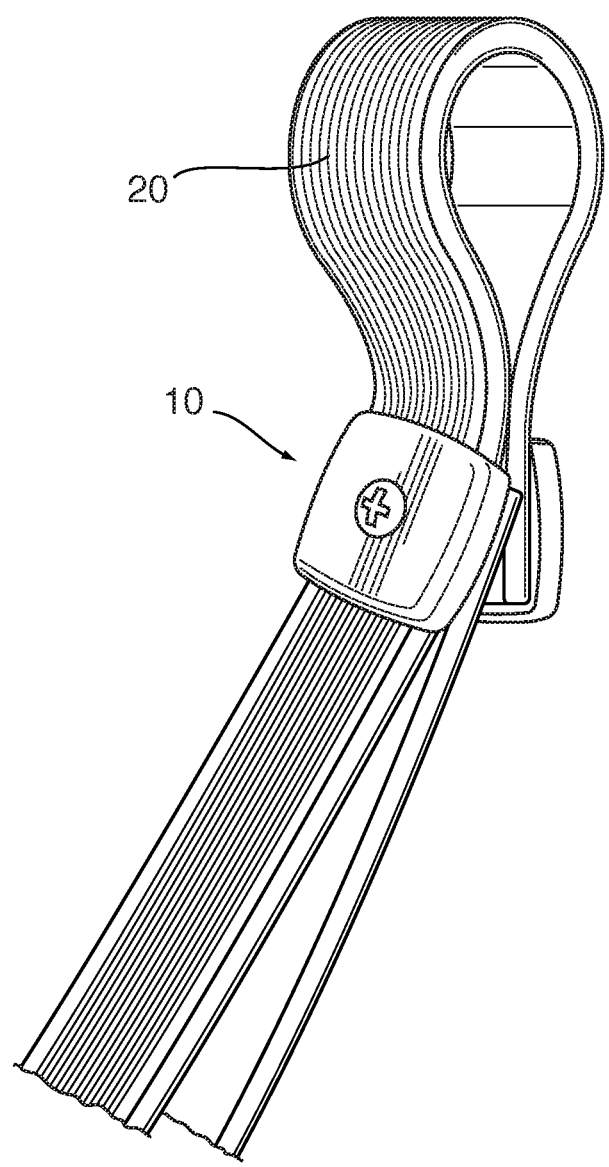
FIG. 1 is a prior art strap clamp.

FIG. 1 shows a prior art strap clamp 10 with a twisted strap 20, in which the two pieces of the strap clamp 10 are out of alignment.

Figure 2:
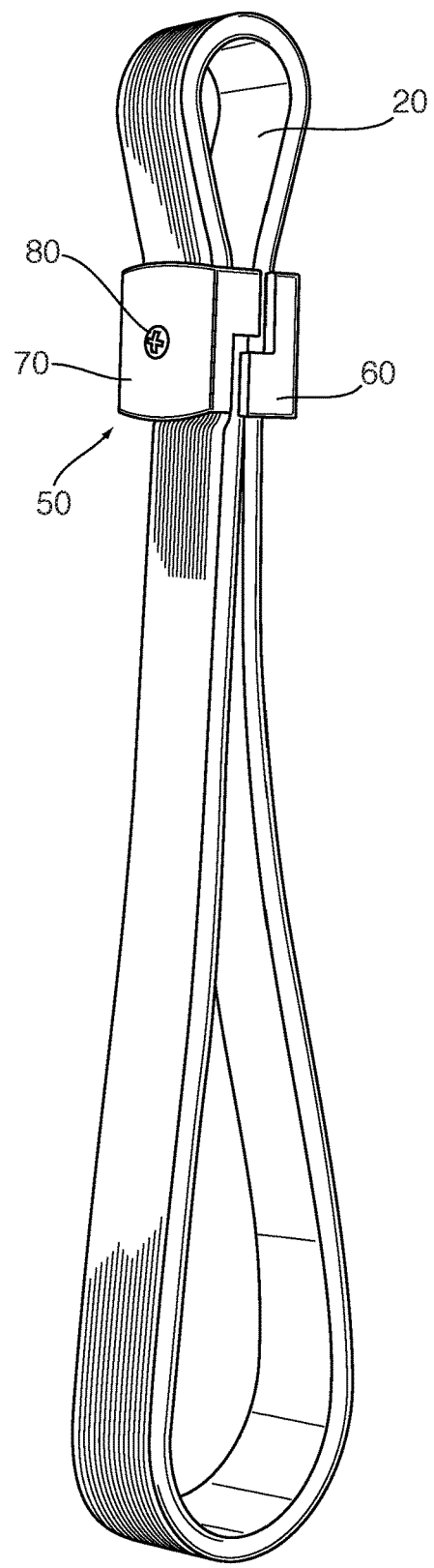
FIG. 2 is a perspective view of an interlocking strap clamp of the present invention on a strap.
Figure 3:
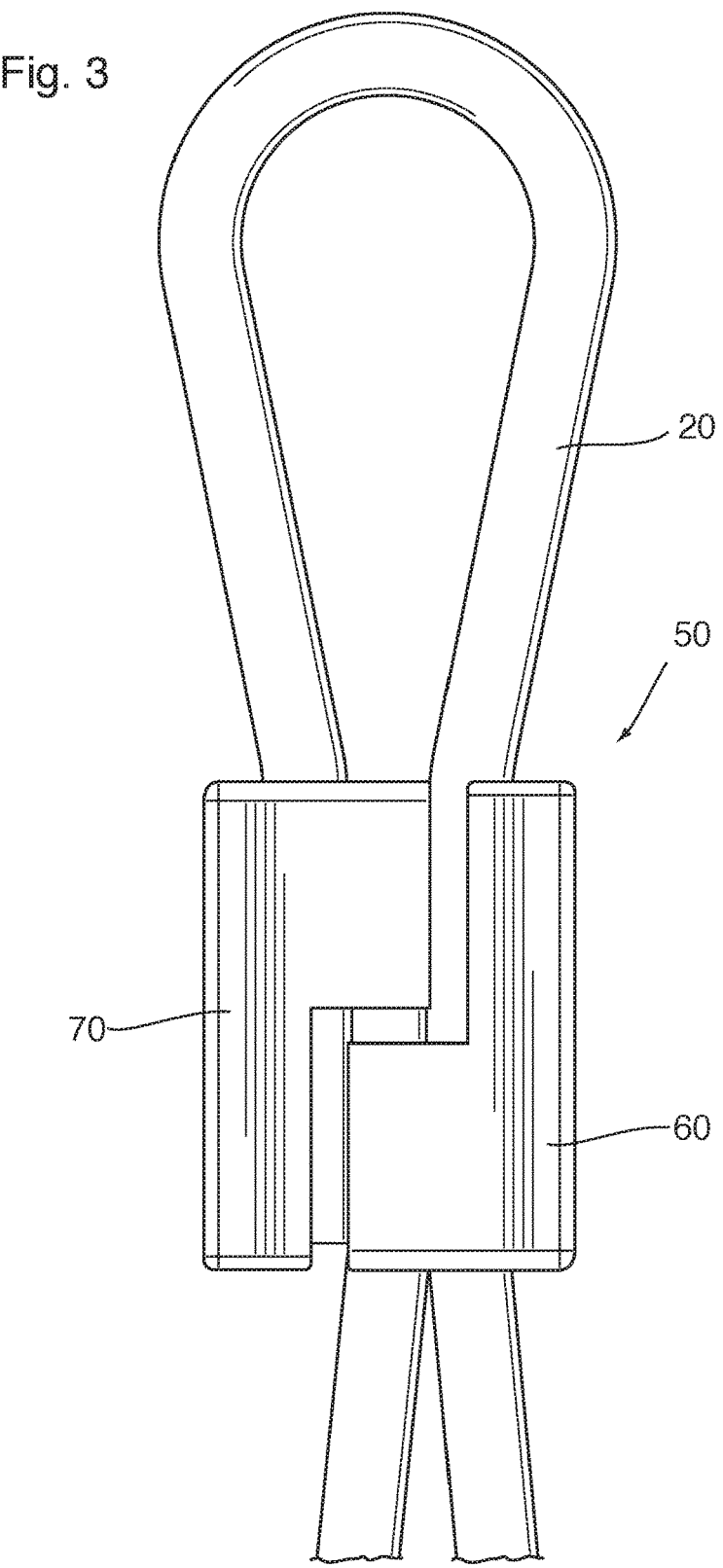
FIG. 3 is a side plan view of an interlocking strap clamp of FIG. 2.

FIGS. 2 and 3 show an interlocking strap clamp 50 of the present invention comprising a first piece 70 and a second piece 60 fixed on a strap 20 by a screw 80. In this embodiment the strap 20 is one piece of strapping, the ends of which overlap under the clamp to create three layers. Although not shown, the screw 80 passes through holes in the three layers of the strap 20. The second piece 60 partially covers an outer layer and a middle layer of the overlapping strap 20, and the first piece 70 partially covers an outer layer and a middle layer of the strap. The strap is shown with the overlapping ends adjacent to the first piece 70, but could also be adjacent to the overlapping ends of the second piece 60.

Figure 4:
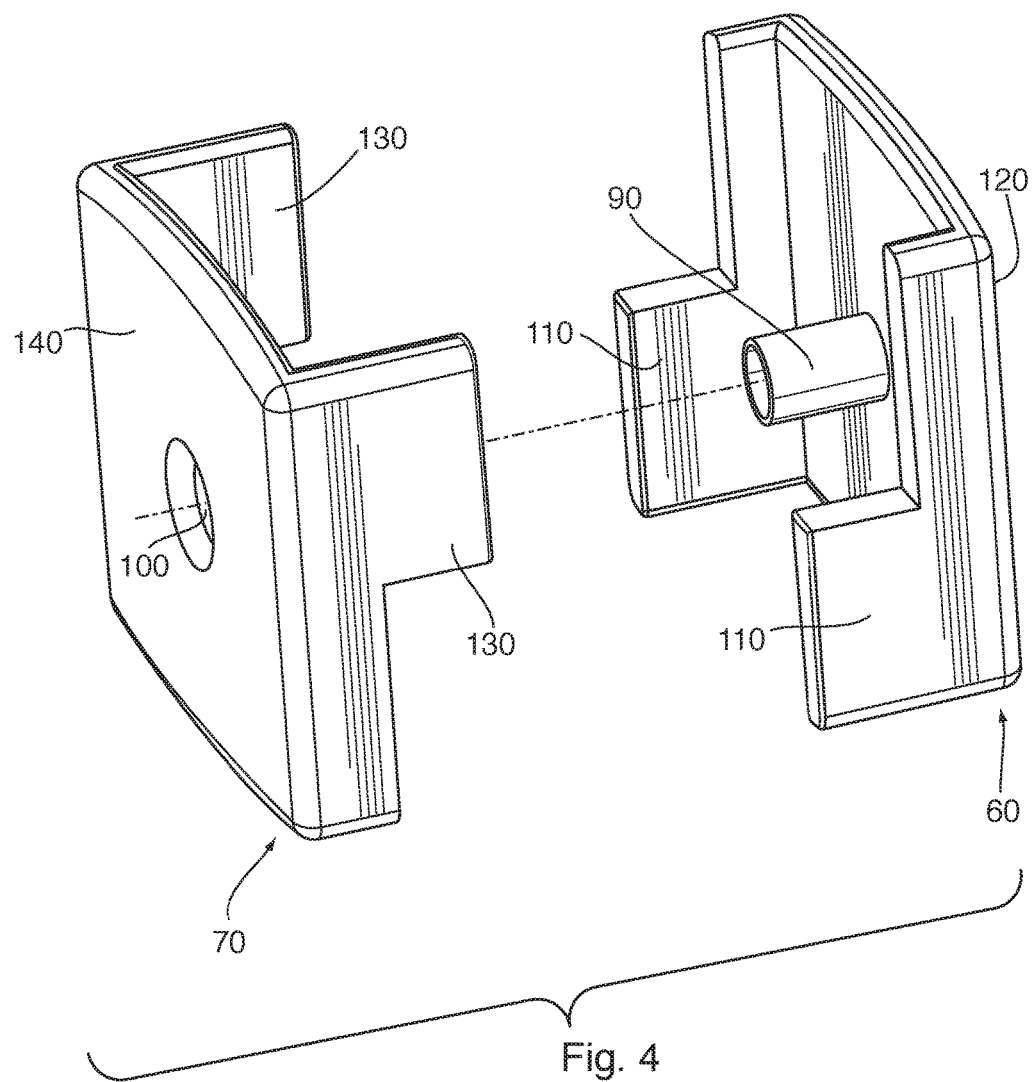
FIG. 4 is a perspective view of a first piece and a second piece of an interlocking strap clamp of the present invention.
Figure 5:
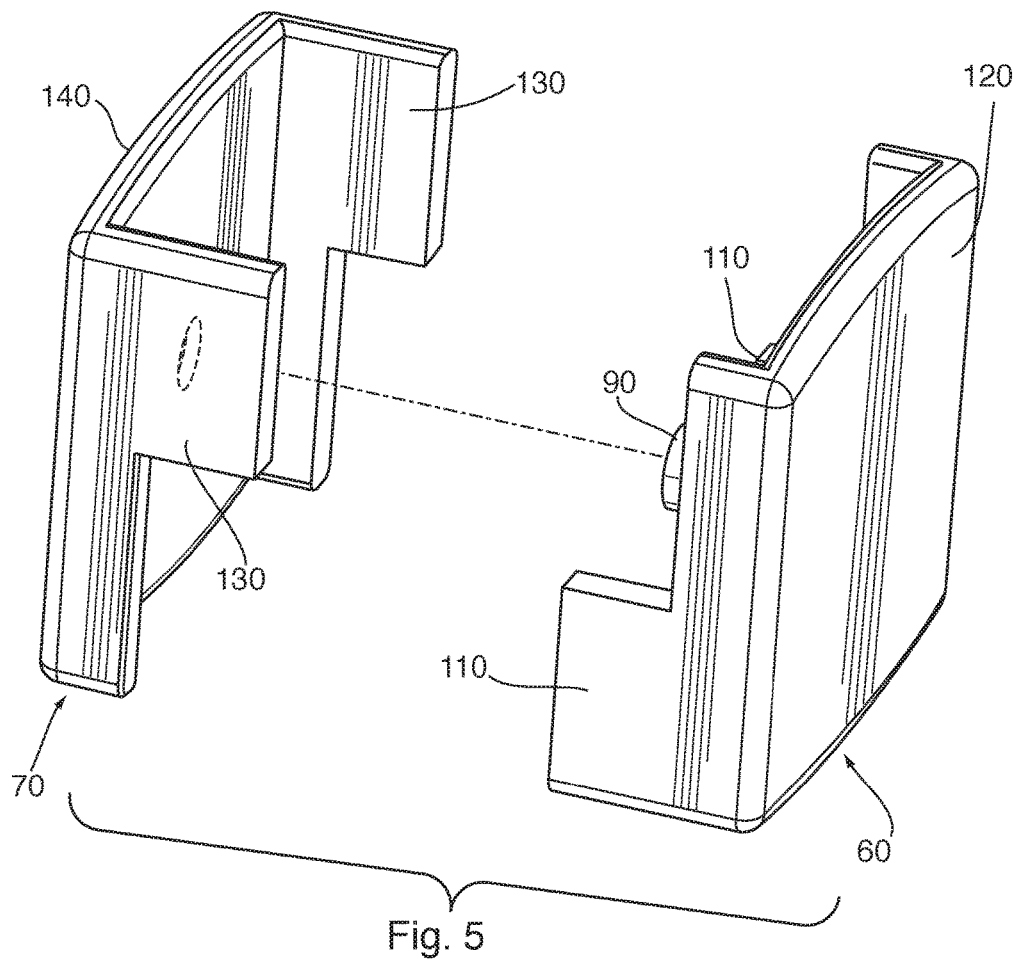
FIG. 5 is a perspective view of the interlocking strap clamp of FIG. 4.

FIGS. 4 and 5 show the interlocking strap clamp 50 without the strap 20 and screw 80. The first piece 70 has L shaped first piece sides 130 on a first main body 140 with an opening 100. The second piece 60 has L shaped second piece sides 110 on a second main body 120 with an internally threaded blind insert 90 on the inner aspect of the second main body 120. When affixed to the three layers of the strap 20, the first piece sides 130 interlock with the second piece sides 110. A machine screw is inserted into opening 100, through holes in the strap 20 (not shown) and threaded into insert 90 until secured.

Figure 6:
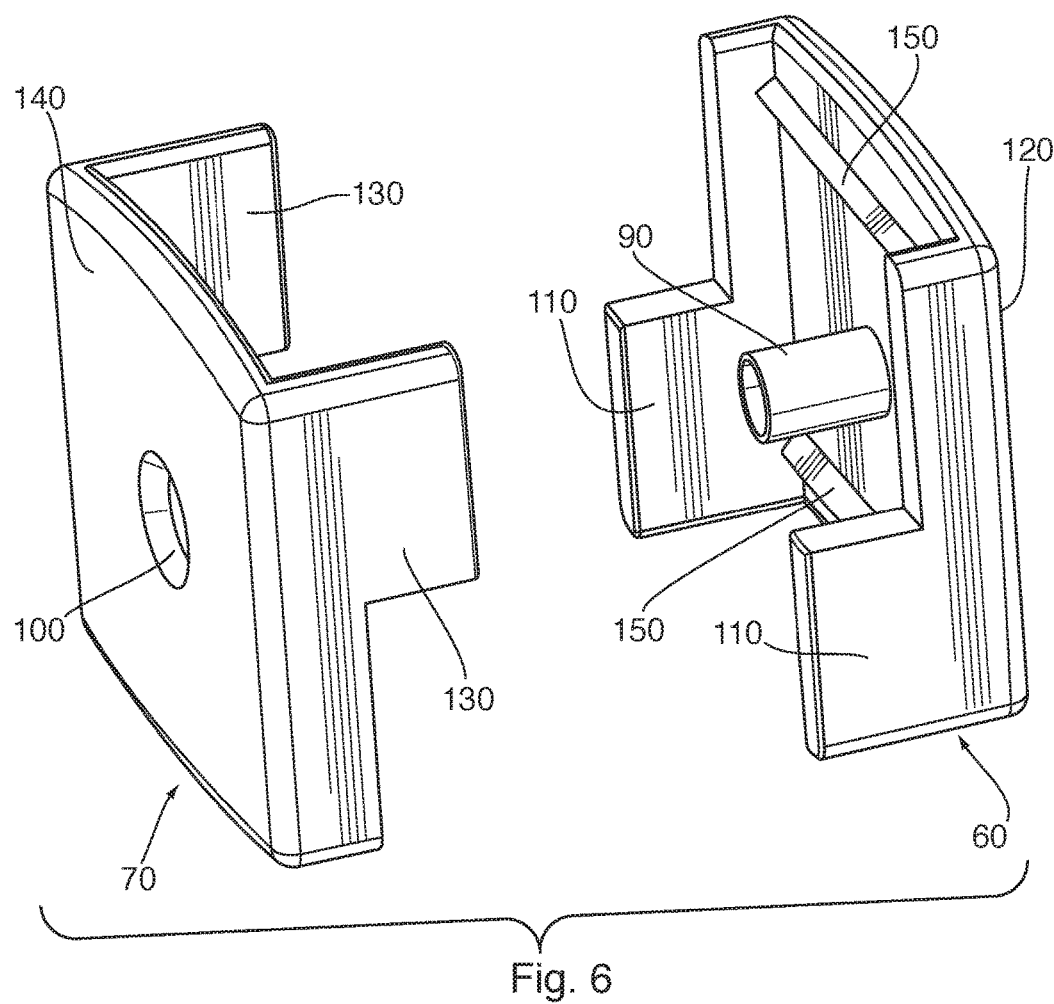
FIG. 6 is a perspective view of a first piece and a second piece of an interlocking strap clamp of a second embodiment of the present invention.

FIG. 6 is a second embodiment of the interlocking strap clamp 50 in which teeth 150 are added to the first piece and second piece in order to provide further grip on the strap 20 (not shown).

The extending arms, namely the lower arms of the "L" shapes, of the first piece sides and the second piece sides prevent the clamp pieces from twisting out of alignment. After the interlocking strap clamp is installed onto a strap, the extending arms of the side pieces will extend so as to enclose not only the front and back layers of the sides of the strap material, but the third middle layer as well. With all three layers of the strap enclosed by the interlocking strap clamp, the two pieces of the clamp are not able to twist freely should the machine screw become loose.

The extending arms of the first piece sides and the extending arms of the second piece sides will abut if the two sides begin to twist and misalign. Once the extending arms meet, the pieces will be prevented from twisting or misaligning any further.

As will be understood, the shapes of the sides may vary provided that they are interlocking. For example, instead of interlocking "L" shaped sides, there could be interlocking "P" shaped sides etc. As well, instead of the first piece sides being matching bookends of upside down "Ls", they could comprise a mismatched upside down "L" side with an "L" side, provided that the second piece sides are likewise mismatched in order to interlock with the first piece sides.

The present invention will prevent or lessen strap clamp twisting and misalignment. This will prevent or lessen damage and premature wear to the strap and will also maintain the aesthetic of the properly aligned clamp. The present invention will also tend to prevent the machine screw from loosening through the continued twisting of the clamp, and thereby decrease the potential for passenger injury.

The interlocking strap clamp of the present invention can be made of metals, such as zinc, or plastics, such as acrylonitrile butadiene styrene ("ABS").

While embodiments of the invention have been described in the detailed description, the scope of the claims should not be limited by the preferred embodiments set forth in the examples, but should be given the broadest interpretation consistent with the description as a whole.

What is claimed:

1. An interlocking strap clamp and a strap to be secured by the interlocking strap clamp, the interlocking strap clamp comprising a screw, a first piece with a body and p-shaped sides, and a second piece with a body and d-shaped sides interlocking relative to the first piece, wherein the first piece and second piece are capable of clamping onto the strap through a securing means comprised of an opening with a diameter sized for the screw in the first piece and an internally threaded insert for the screw in the second piece, the screw being configured to pass through the strap.

2. The interlocking strap clamp of claim 1, which additionally comprises one or more teeth on the first piece and one or more teeth on the second piece, said teeth capable of digging into a strap when the first piece and second piece are clamped onto a strap.

3. The interlocking strap clamp of claim 1, wherein the internally threaded insert is configured to pass through the strap.

4. The interlocking strap clamp of claim 1, wherein the opening on the first piece is defined on an external surface, and the opening is disposed substantially at the geometric center of the external surface.

* * * * *